United States Patent
Mitsui et al.

(10) Patent No.: US 10,147,160 B2
(45) Date of Patent: Dec. 4, 2018

(54) IMAGE MANAGEMENT APPARATUS AND SYSTEM, AND METHOD FOR CONTROLLING DISPLAY OF CAPTURED IMAGE

(71) Applicants: Satoshi Mitsui, Kanagawa (JP); Tatsuya Nagafuchi, Kanagawa (JP)

(72) Inventors: Satoshi Mitsui, Kanagawa (JP); Tatsuya Nagafuchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 127 days.

(21) Appl. No.: 15/270,583

(22) Filed: Sep. 20, 2016

(65) Prior Publication Data

US 2017/0091899 A1 Mar. 30, 2017

(30) Foreign Application Priority Data

Sep. 30, 2015 (JP) ................................. 2015-194289
Aug. 12, 2016 (JP) ................................. 2016-158865

(51) Int. Cl.
| | | |
|---|---|---|
| G06T 3/00 | (2006.01) | |
| H04N 5/232 | (2006.01) | |
| H04N 5/272 | (2006.01) | |
| G06T 11/60 | (2006.01) | |

(52) U.S. Cl.
CPC ............ *G06T 3/0081* (2013.01); *G06T 11/60* (2013.01); *H04N 5/23238* (2013.01); *H04N 5/272* (2013.01)

(58) Field of Classification Search
CPC ... G06T 3/0081; H04N 5/23238; H04N 5/272
See application file for complete search history.

(56) References Cited

U.S. PATENT DOCUMENTS

2003/0103063 A1 6/2003 Mojaver et al.
2004/0212629 A1* 10/2004 Ohkawa ................ H04N 7/147
                                                                345/629
2006/0195786 A1 8/2006 Stoen et al.
(Continued)

FOREIGN PATENT DOCUMENTS

| JP | 7-200876 | 8/1995 |
|---|---|---|
| JP | 2008-203940 | 9/2008 |

(Continued)

OTHER PUBLICATIONS

Extended European Search Report dated Feb. 16, 2017 in Patent Application No. 16191016.1.

*Primary Examiner* — Huy T Nguyen
(74) *Attorney, Agent, or Firm* — Oblon, McClelland, Maier & Neustadt, L.L.P.

(57) ABSTRACT

An image management apparatus controls a display of a captured image, the apparatus being connected to a communication terminal through a network. The apparatus includes a receiver and circuitry. The receiver receives, from the communication terminal, an instruction for displaying a drawn image drawn by a user on a captured image while the captured image is being displayed to the user, the captured image being a full spherical panoramic image. The circuitry generates an attachment image containing the drawn image, and attaches the attachment image containing the drawn image to the captured image, the attachment image containing the drawn image being a planar image.

6 Claims, 21 Drawing Sheets

(56) References Cited

U.S. PATENT DOCUMENTS

| | | |
|---|---|---|
| 2012/0162444 A1 | 6/2012 | Suda |
| 2014/0176542 A1 | 6/2014 | Shohara et al. |
| 2014/0184821 A1 | 7/2014 | Taneichi et al. |
| 2015/0054838 A1 | 2/2015 | Koo |

FOREIGN PATENT DOCUMENTS

| | | |
|---|---|---|
| JP | 2014-127001 | 7/2014 |
| JP | 2014-131215 | 7/2014 |
| WO | WO 2009/091559 A1 | 7/2009 |

\* cited by examiner

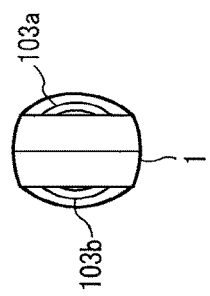
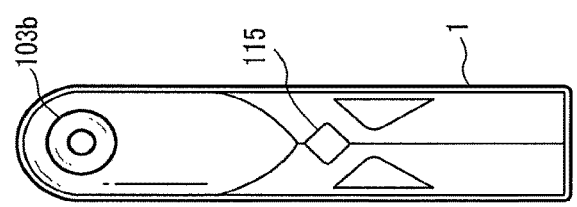
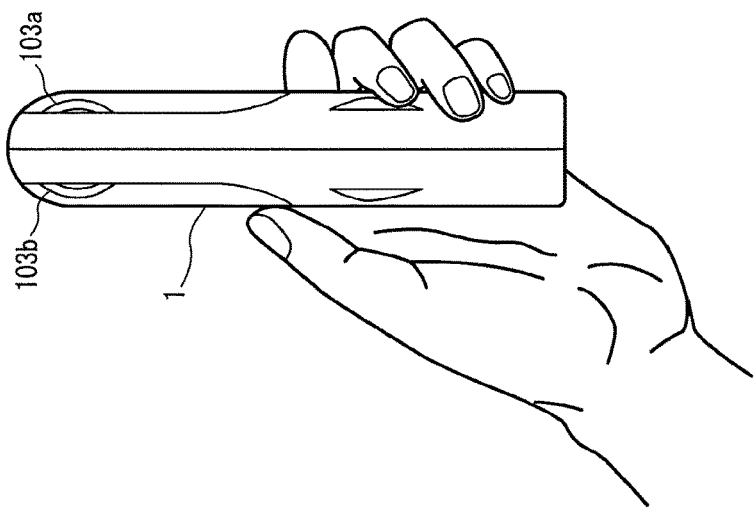

FIG. 3A
FIG. 3B
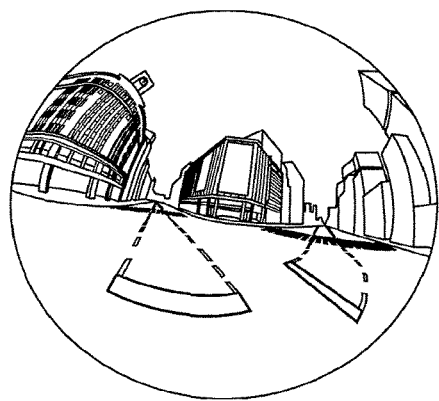
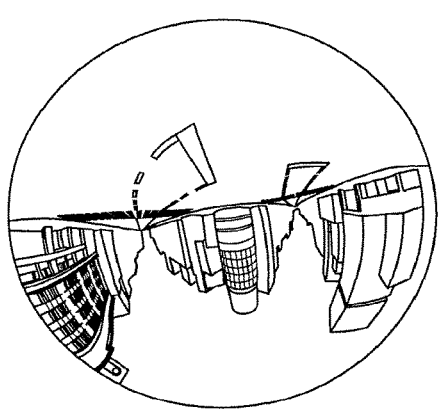
FIG. 3C
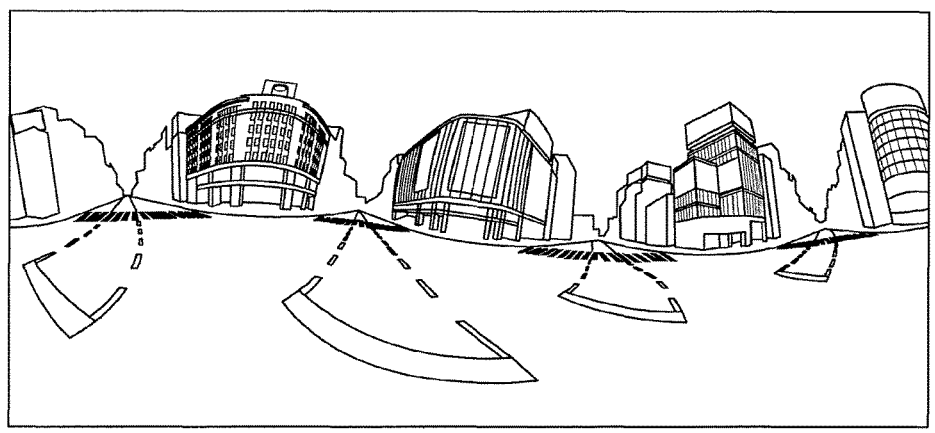

FIG. 13

CAPTURED-IMAGE MANAGEMENT TABLE

| USER ID | CAPTURED-IMAGE ID | FILE NAME OF CAPTURED IMAGE DATA | CAPTURING DATE |
|---|---|---|---|
| A001 | p0001 | au1415ifauy.jpg | 2015.7.5. 10:00 |
| A002 | p0002 | au1416ifauy.jpg | 2015.7.5. 10:10 |
| ... | ... | ... | ... |

FIG. 14

ATTACHMENT IMAGE MANAGEMENT TABLE

| CAPTURED IMAGE ID | ATTACH-MENT IMAGE ID | FILE NAME OF ATTACHMENT IMAGE DATA | ATTACHMENT POSITION | | | REFERENCE POSITION | | | SIZE OF ATTACH-MENT IMAGE | |
|---|---|---|---|---|---|---|---|---|---|---|
| | | | X | Y | Z | X | Y | Z | W | H |
| p0001 | a0101 | Image0101jpg. | X11 | Y11 | Z11 | X01 | Y01 | Z01 | W1 | H1 |
| | a0102 | Image0102jpg. | X12 | Y12 | Z12 | X02 | Y02 | Z02 | W2 | H2 |
| p0002 | a0201 | ... | ... | ... | ... | ... | ... | ... | ... | ... |
| | a0202 | ... | ... | ... | ... | ... | ... | ... | ... | ... |
| | a0203 | ... | ... | ... | ... | ... | ... | ... | ... | ... |
| ... | ... | ... | ... | ... | ... | ... | ... | ... | ... | ... |

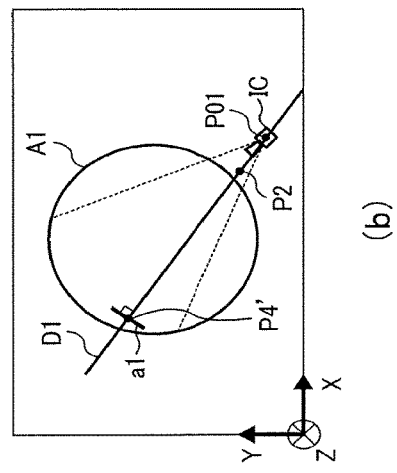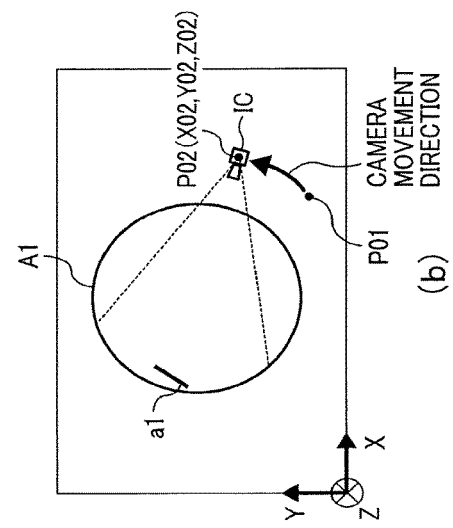
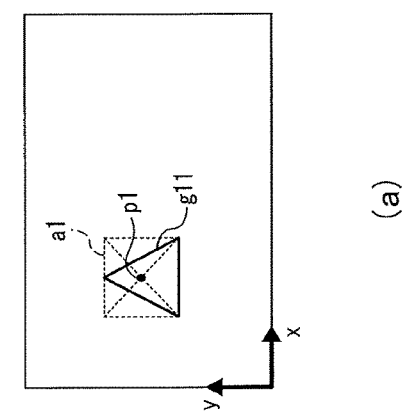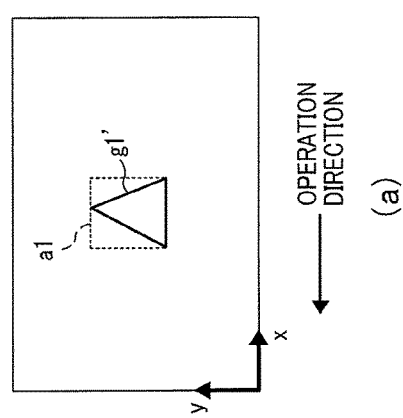
FIG. 23
FIG. 24

IMAGE MANAGEMENT APPARATUS AND SYSTEM, AND METHOD FOR CONTROLLING DISPLAY OF CAPTURED IMAGE

CROSS-REFERENCE TO RELATED APPLICATIONS

This patent application is based on and claims priority pursuant to 35 U.S.C. § 119(a) to Japanese Patent Application Nos. 2015-194289, filed on Sep. 30, 2015, and 2016-158865, filed on Aug. 12, 2016 in the Japan Patent Office, the entire disclosures of which are hereby incorporated by reference herein.

BACKGROUND

Technical Field

The present disclosure relates to an image management apparatus and system, and a method for controlling a display of a captured image.

Description of the Related Art

Some recent digital cameras allow a user to capture a 360-degree full spherical panoramic image surrounding the user (see JP-2014-131215-A).

In addition, a system or an apparatus is known that generates an attachment image containing a drawn-image that is drawn by a user on an image being displayed to the user.

However, when the attachment image is attached to a predetermined-area image, which is a part of the full spherical image, the attachment image is attached as being curved along a surface of the solid sphere. When the point of view is moved, the drawn-image having a shape different from that of the image that is originally drawn is displayed.

SUMMARY

Example embodiments of the present invention include an image management apparatus controls a display of a captured image, the apparatus being connected to a communication terminal through a network. The apparatus includes a receiver and circuitry. The receiver receives, from the communication terminal, an instruction for displaying a drawn image drawn by a user on a captured image while the captured image is being displayed to the user, the captured image being a full spherical panoramic image. The circuitry generates an attachment image containing the drawn image, and attaches the attachment image containing the drawn image to the captured image, the attachment image containing the drawn image being a planar image.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 1A is a left side view of an image capturing device according to an embodiment of the present invention;

FIG. 1B is a front view of the image capturing device of FIG. 1A;

FIG. 1C is a plan view of the image capturing device of FIG. 1A;

FIG. 3A is a view illustrating a front side of a hemispherical image captured by the image capturing device of FIG. 1 according to an embodiment of the present invention;

FIG. 3B is a view illustrating a back side of the hemispherical image captured by the image capturing device of FIG. 1 according to an embodiment of the present invention;

FIG. 3C is a view illustrating an image captured by the image capturing device of FIG. 1, represented by Mercator projection according to an embodiment of the present invention;

FIG. 13 is an example of a captured-image management table according to an embodiment of the present invention;

FIG. 14 is an example of an attachment-image management table according to an embodiment of the present invention;

FIG. 23 illustrates a two-dimensional drawing area in each of the image management system and the second communication terminal according to an embodiment of the present invention in (a), and a three-dimensional virtual space in the image management system according to an embodiment of the present invention in (b);

FIG. 24 illustrates a two-dimensional drawing area in each of the image management system and the second communication terminal according to an embodiment of the present invention in (a), and a three-dimensional virtual space in the image management system according to an embodiment of the present invention in (b);

DETAILED DESCRIPTION

Figure 2:
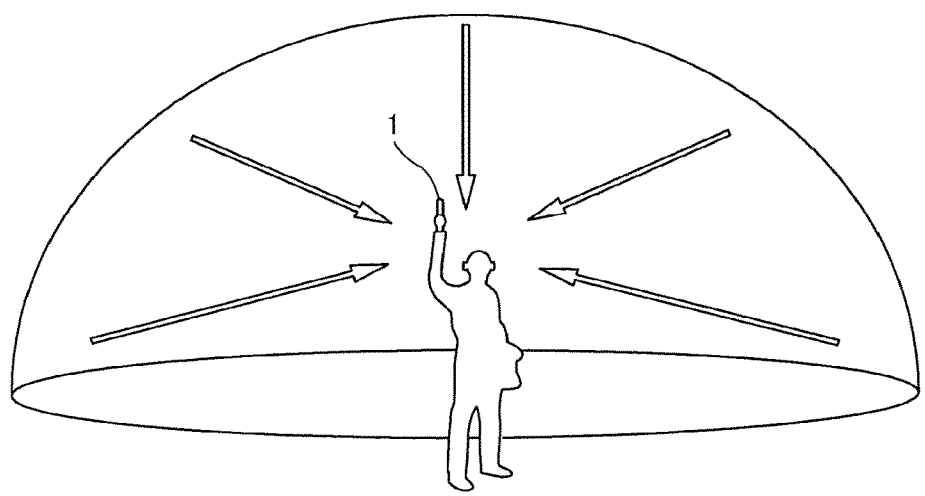
FIG. 2 is an illustration for explaining how a user uses the image capturing device of FIG. 1A to 1C (FIG. 1) according to an embodiment of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

An example embodiment of the present invention will be described hereinafter with reference to drawings.

First, a description is given of an operation of generating a full spherical panoramic image, with reference to FIGS. 1 to 7.

Hereinafter, a description is given of an external view of an image capturing device 1 with reference to FIGS. 1A to 1C. The image capturing device 1 is a digital camera for capturing an image from which the full spherical panoramic image is generated. FIGS. 1A to 1C are respectively a left side view, a front view, and a plan view of the image capturing device 1.

As illustrated in FIG. 1A, the image capturing device 1 has a shape such that one can hold it with one hand. Further, as illustrated in FIGS. 1A to 1C, an image pickup device 103a is provided on a front side (anterior side) of an upper section of the image capturing device 1, and an image pickup device 103b is provided on a back side (rear side) thereof. These image pickup devices 103a and 103b are respectively used with optical members (e.g., fisheye lenses 102a and 102b), each being capable of capturing a semi-spherical image (180-degree or more angle of view). Furthermore, as illustrated in FIG. 1B, an operation unit 115 such as a shutter button is provided on the back side (rear side) of the image capturing device 1.

Hereinafter, a description is given of a situation where the image capturing device 1 is used with reference to FIG. 2. FIG. 2 is an example illustration of how a user uses the image capturing device 1. As illustrated in FIG. 2, for example, the image capturing device 1 is used for capturing objects surrounding the user who is holding the image capturing device 1 in his/her hand. The image pickup devices 103a and 103b illustrated in FIGS. 1A to 1C capture the objects surrounding the user to obtain two hemispherical images.

Figure 4B:
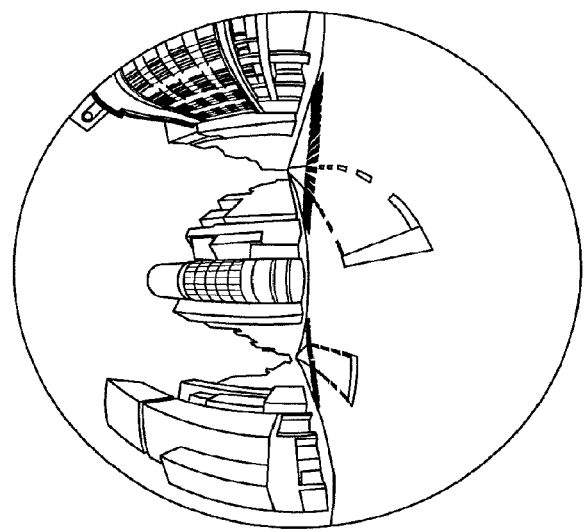
FIG. 4B is a view illustrating a full spherical panoramic image according to an embodiment of the present invention.
Figure 4A:
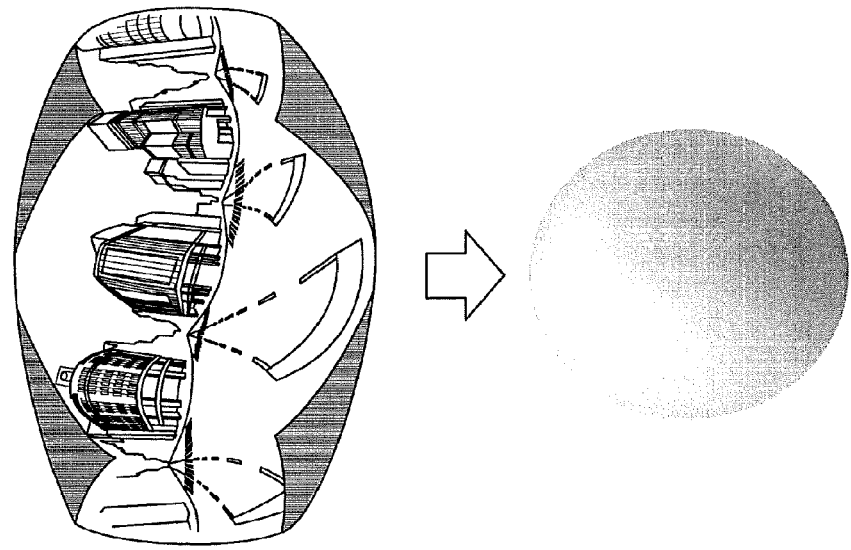
FIG. 4A is an illustration for explaining how the image represented by Mercator projection covers a surface of a sphere according to an embodiment of the present invention.

Hereinafter, a description is given of an overview of an operation of generating the full spherical panoramic image from the image captured by the image capturing device 1 with reference to FIGS. 3A to 3C and FIGS. 4A and 4B. FIG. 3A is a view illustrating a front side of a hemispherical image captured by the image capturing device 1. FIG. 3B is a view illustrating a back side of the hemispherical image captured by the image capturing device 1. FIG. 3C is view illustrating an image represented by Mercator projection. The image represented by Mercator projection as illustrated in FIG. 3C is referred to as a "Mercator image" hereinafter. FIG. 4A is an illustration of how the Mercator image covers a surface of a sphere. FIG. 4B is a view illustrating the full spherical panoramic image.

Figure 9:
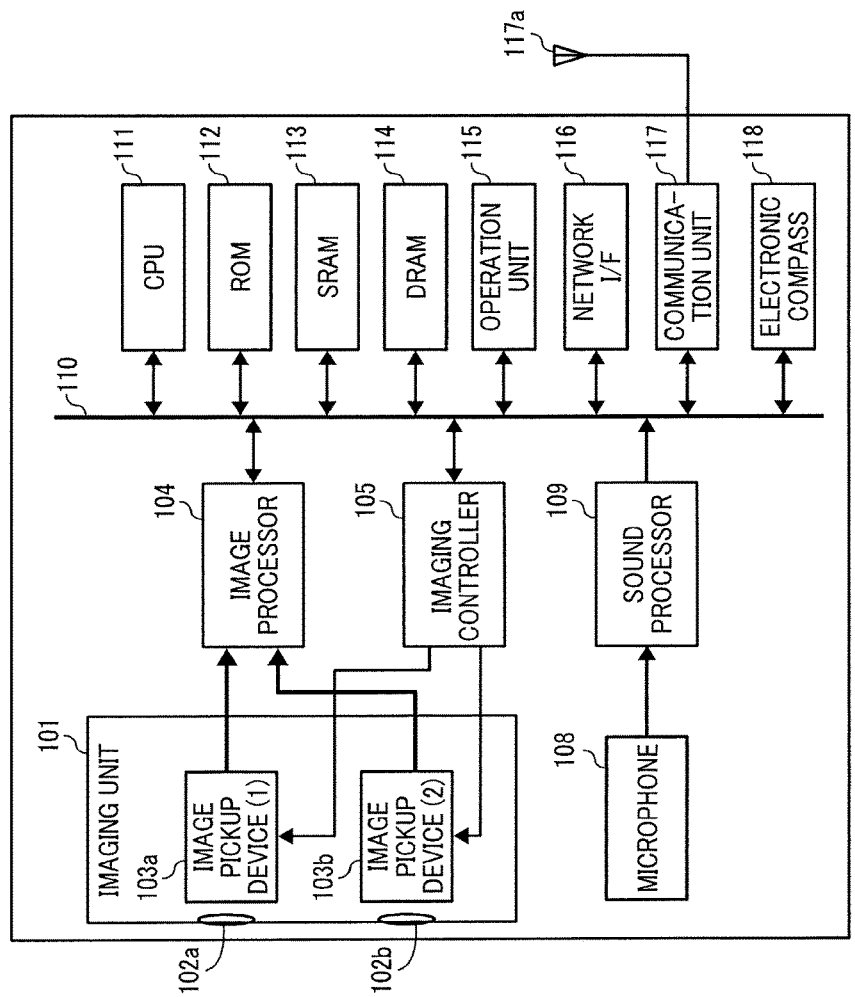
FIG. 9 is a block diagram illustrating a hardware configuration of the image capturing device of FIG. 1 according to an embodiment of the present invention.

As illustrated in FIG. 3A, the image captured by the image pickup device 103a is a curved hemispherical image (front side) taken through a fisheye lens 102a (FIG. 9). Also, as illustrated in FIG. 3B, the image captured by the image pickup device 103b is a curved hemispherical image (back side) taken through a fisheye lens 102b (FIG. 9). The image capturing device 1 combines the hemispherical image (front side) and the hemispherical image (back side), which is reversed by 180-degree from each other, to generate the Mercator image as illustrated in FIG. 3C.

The Mercator image is attached to the sphere surface using Open Graphics Library for Embedded Systems (OpenGL ES) as illustrated in FIG. 4A. Thus, the full spherical panoramic image as illustrated in FIG. 4B is generated. In other words, the full spherical panoramic image is represented as the Mercator image facing toward a center of the sphere. Note that OpenGL ES is a graphic library used for visualizing two-dimensional (2D) and three-dimensional (3D) data. The full spherical panoramic image is either a still image or a movie.

One may feel strange viewing the full spherical panoramic image, because the full spherical panoramic image is an image attached to the sphere surface. To resolve this strange feeling, an image of a predetermined area, which is a part of the full spherical panoramic image, is displayed as a planar image having less curves. The image of the predetermined area is referred to as a "predetermined-area image" hereinafter. Hereinafter, a description is given of displaying the predetermined-area image with reference to FIG. 5 and FIGS. 6A and 6B.

Figure 5:
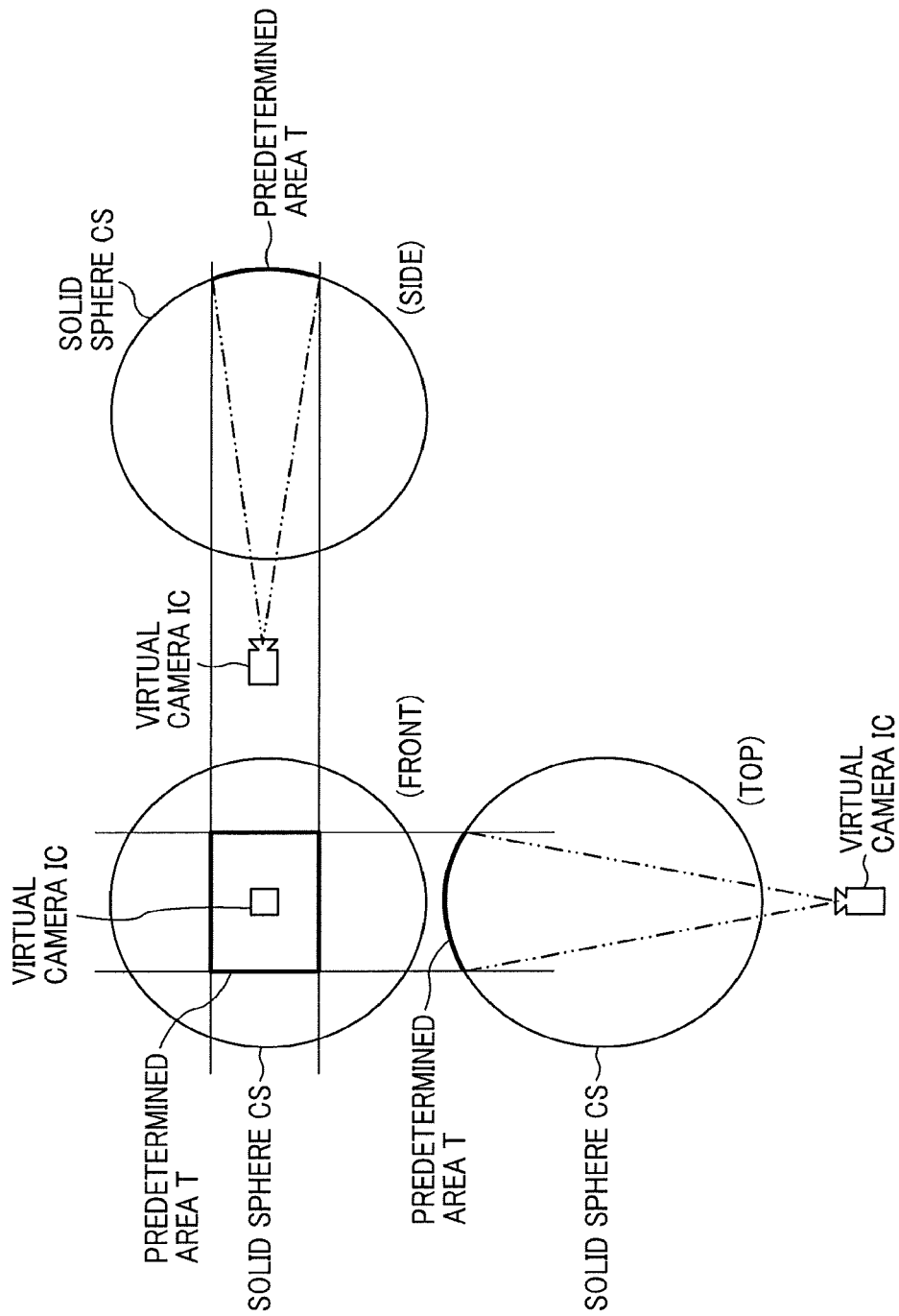
FIG. 5 is a view illustrating positions of a virtual camera and a predetermined area in a case in which the full spherical panoramic image is represented as a three-dimensional solid sphere.
Figure 6A:
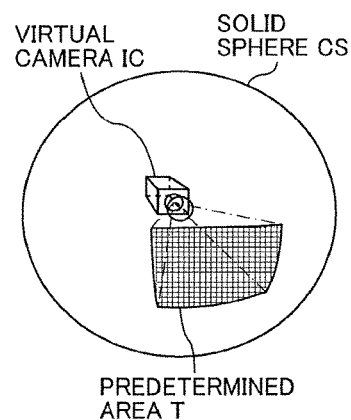
FIG. 6A is a perspective view of FIG. 5.
Figure 6B:
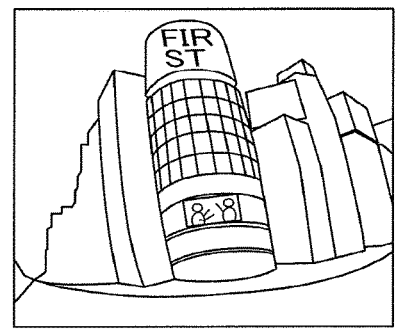
FIG. 6B is a view illustrating an image of the predetermined area on a display of a communication terminal according to an embodiment of the present invention.

FIG. 5 is a view illustrating positions of a virtual camera IC and a predetermined area T in a case in which the full spherical panoramic image is represented as a three-dimensional solid sphere. The virtual camera IC corresponds to a position of a point of view of a user who is viewing the full spherical panoramic image represented as the three-dimensional solid sphere. FIG. 6A is a perspective view of FIG. 5. FIG. 6B is a view illustrating the predetermined-area image displayed on a display. In FIG. 6A, the full spherical panoramic image illustrated in FIG. 4B is illustrated as a three-dimensional solid sphere CS. Assuming that the generated full spherical panoramic image is the solid sphere CS, the virtual camera IC is outside of the full spherical panoramic image as illustrated in FIG. 5. The predetermined area T in the full spherical panoramic image is specified by predetermined-area information of the position of the virtual camera IC in the full spherical panoramic image. The predetermined-area information is represented by, for example, a coordinate (x (rH), y (rV), and angle of view α (angle)) or a coordinate (X, Y, Z). Zooming of the predetermined area T is implemented by enlarging or reducing a range of the angle of view α. In other words, zooming of the predetermined area T is implemented by enlarging or reducing an arc. Further, zooming of the predetermined area T is implemented by moving the virtual camera IC toward or away from the full spherical panoramic image.

An image of the predetermined area T in the full spherical panoramic image, illustrated in FIG. 6A, is displayed on a display as the predetermined-area image, as illustrated in FIG. 6B. FIG. 6B illustrates an image represented by the predetermined-area information (x, y, α), which is set by default.

Figure 7:
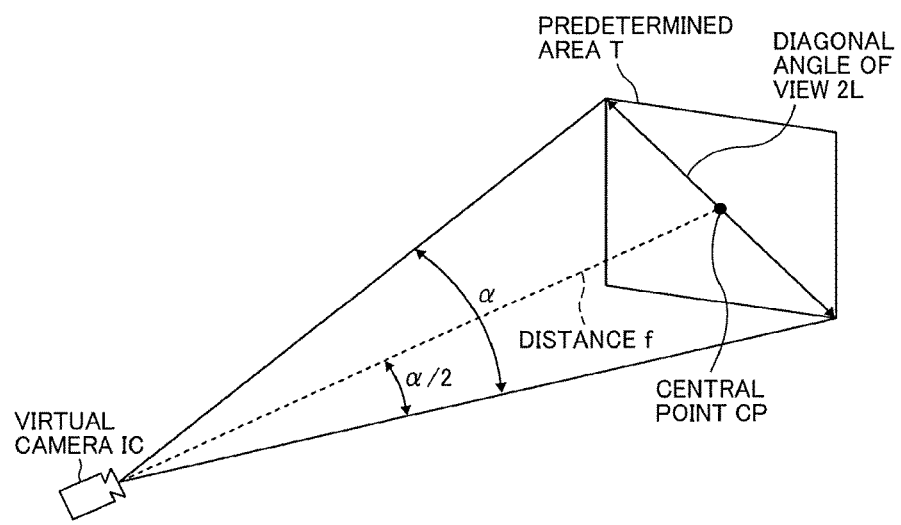
FIG. 7 is a view illustrating a relation between predetermined-area information and a predetermined-area image.

Hereinafter, a description is given of a relation between the predetermined-area information and the predetermined-area image with reference to FIG. 7. As illustrated in FIG. 7, a center point CP of 2 L provides the parameters (x, y) of the predetermined-area information, where 2 L denotes a diagonal angle of view of the predetermined area T. Distance f denotes a distance from the virtual camera IC to the central point CP. In FIG. 7, a trigonometric function equation generally expressed by the following equation is satisfied.

$$Lf = \tan(\alpha/2)$$

Hereinafter, a description is given of an overview of a configuration of an image communication system 10 according to this embodiment with reference to FIG. 8.

Figure 8:
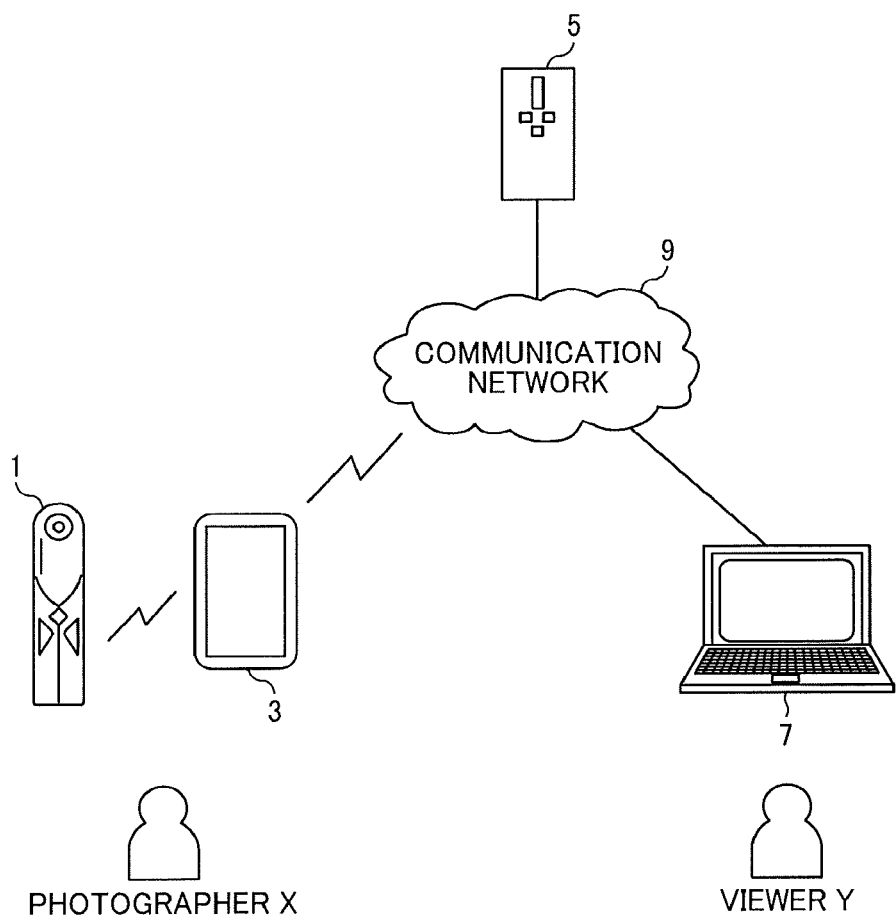
FIG. 8 is a schematic diagram illustrating a configuration of an image communication system including an image management system, a first communication terminal, and a second communication terminal according to an embodiment of the present invention.

As illustrated in FIG. 8, the image communication system 10 includes the image capturing device 1, a communication terminal 3, an image management system 5, and a communication terminal 7.

As described above, the image capturing device 1 is a digital camera capable of obtaining the full spherical panoramic image. Alternatively, the image capturing device 1 may be a typical digital camera. In a case in which the communication terminal 3 includes a camera, the communication terminal 3 may also operate as the digital camera. In this embodiment, a description is given of a case in which the image capturing device 1 is a digital camera that is capable of obtaining the full spherical panoramic image, in order to make the description simple. The communication terminal 3 communicates data with the image capturing device 1 by a wireless communication such as wireless fidelity (Wi-Fi). In addition, the communication terminal 3 communicates data with the image management system 5 via a communication network 9. The communication network 9 is implemented by, for example, the Internet.

The image management system 5 communicates data with the communication terminal 3 and the communication terminal 7 via the communication network 9. The image management system 5 is implemented by, for example, a server computer. The image management system 5 is installed with OpenGL ES to generate the full spherical panoramic image. Further, the image management system 5 generates the predetermined-area information representing a part of the full spherical panoramic image. Alternatively, the image management system 5 generates the predetermined-area image defined by the predetermined-area information. The image management system 5 provides the communication terminal 7 with captured-image data and the predetermined-area information (or the predetermined-area image).

The communication terminal 7 communicates data with the image management system 5 via the communication network 9. The communication terminal 7 is implemented by, for example, a laptop computer. The image management system 5 may be implemented by either a single server computer or a plurality of server computers.

The image capturing device 1 and the communication terminal 3 are each used by a photographer X. The communication terminal 3 could be more than one, each placed at each site. The communication terminal 7 is used by a viewer Y. The image management system 5 is placed at, for example, a service enterprise to provide the communication terminal 7 with the captured-image data transmitted from the communication terminals 3 at the different sites.

Hereinafter, a description is given of hardware configurations of the image capturing device 1, the communication terminal 3, the communication terminal 7, and the image management system 5 according to this embodiment with reference to FIGS. 9 to 11.

First, a description is given of a hardware configuration of the image capturing device 1 with reference to FIG. 9. Although a description is given of a case in which the image capturing device 1 is an omnidirectional image capturing device having two image pickup devices, the image capturing device 1 may include three or more image pickup devices. In addition, the image capturing device 1 is not necessarily an image capturing device 1 dedicated to omnidirectional image capturing. Alternatively, an external omnidirectional image capturing unit may be attached to a typical digital camera or a smartphone to implement an image capturing device having the substantially same function as that of the image capturing device 1.

As illustrated in FIG. 9, the image capturing device 1 includes an imaging unit 101, an image processor 104, an imaging controller 105, a microphone 108, a sound processor 109, a central processing unit (CPU) 111, a read only memory (ROM) 112, a static random access memory (SRAM) 113, a dynamic random access memory (DRAM) 114, an operation unit 115, a network interface (I/F) 116, a communication unit 117, an electronic compass 118, and an antenna 117a.

The imaging unit 101 includes two wide-angle lenses (so-called fish-eye lenses) 102a and 102b, each having an angle of view of equal to or greater than 180 degrees so as to form a hemispheric image. The imaging unit 101 further includes the two image pickup device 103a and 103b corresponding to the wide-angle lenses 102a and 102b respectively. The image pickup devices 103a and 103b each includes an image sensor such as a complementary metal oxide semiconductor (CMOS) sensor and a charge-coupled device (CCD) sensor, a timing generation circuit, and a group of registers. The image sensor converts an optical image formed by the wide-angle lenses 102a and 102b into electric signals to output image data. The timing generation circuit generates horizontal or vertical synchronization signals, pixel clocks and the like for the image sensor. Various commands, parameters and the like for operations of the image pickup devices 103a and 103b are set in the group of registers.

Each of the image pickup devices 103a and 103b of the imaging unit 101 is connected to the image processor 104 via a parallel I/F bus. In addition, each of the image pickup device 103a and 103b of the imaging unit 101 is connected to the imaging controller 105 via a serial I/F bus such as an I2C bus. The image processor 104 and the imaging controller 105 are each connected to the CPU 111 via a bus 110. Furthermore, the ROM 112, the SRAM 113, the DRAM 114, the operation unit 115, the network I/F 116, the communication unit 117, and the electronic compass 118 are also connected to the bus 110.

The image processor 104 acquires the image data from each of the image pickup devices 103a and 103b via the parallel I/F bus and performs predetermined processing on each acquired image data. Thereafter, the image processor 104 combines these image data, on which the predetermined processing is performed, to generate data of the Mercator image illustrated in FIG. 3C.

The imaging controller 105 sets commands and the like in the group of registers of the image pickup devices 103a and 103b via the I2C bus, while the imaging controller 105 usually operates as a master device and the image pickup devices 103a and 103b each usually operates as a slave device. The imaging controller 105 receives necessary commands and the like from the CPU 111. Further, the imaging controller 105 acquires status data and the like from the group of registers of the image pickup devices 103a and 103b via the I2C bus to send the acquired status data and the like to the CPU 111.

Furthermore, the imaging controller 105 instructs the image pickup devices 103a and 103b to output the image data at a time when the shutter button of the operation unit 115 is pushed. The image capturing device 1 may have a preview function or support displaying movie. In this case, the image data are continuously output from the image pickup devices 103a and 103b at a predetermined frame rate (frames per minute).

Furthermore, the imaging controller 105 operates with the CPU 111 to synchronize times when the image pickup devices 103a and 103b output the image data. The image capturing device 1 according to this embodiment does not include a display. However, the image capturing device 1 may include the display.

The microphone 108 converts sounds to audio data (signal). The sound processor acquires the audio data from the microphone 108 via an I/F bus and performs predetermined processing on the audio data.

The CPU 111 controls entire operation of the image capturing device 1 and performs various processing. The ROM 112 stores various programs for the CPU 111. The SRAM 113 and the DRAM 114 each operates as a work memory to store the program loaded from the ROM 112 for execution by the CPU 111 or data in current processing. More specifically, the DRAM 114 stores the image data currently processed by the image processor 104 and the data of the Mercator image on which processing has been performed.

The operation unit 115 collectively refers to various operation keys, a power switch, the shutter button, and a touch panel having functions of both displaying information and receiving input from a user. The user operates the operation keys to instruct specifying various photographing modes or photographing conditions.

The network I/F 116 collectively refers to an interface circuit such as an universal serial bus (USB) I/F that allows the image capturing device 1 to communicate data with an external media such as a SD card or an external personal computer. The network I/F 116 supports at least one of wired and wireless communications. The data of the Mercator image, which is stored in the DRAM 114, is stored in the external media via the network I/F 116 or transmitted to the external device such as the communication terminal 3 via the network I/F 116.

The communication unit 117 is implemented by, for example, an interface circuit. The communication unit 117 communicates data with an external device such as the communication terminal 3 via the antenna 117a by a near distance wireless communication such as Wi-Fi and Near Field Communication (NFC). The communication unit 117 is also capable of transmitting the data of Mercator image to the external device such as the communication terminal 3.

The electronic compass 118 calculates an orientation and a tilt (roll angle) of the image capturing device 1 from the Earth's magnetism to output orientation and tilt information. This orientation and tilt information is an example of related information, which is meta data described in compliance with Exif. This information is used for image processing such as image correction of the captured image. Further, the related information also includes a date and time when the image is captured by the image capturing device 1, and a size of the image data.

Figure 10:
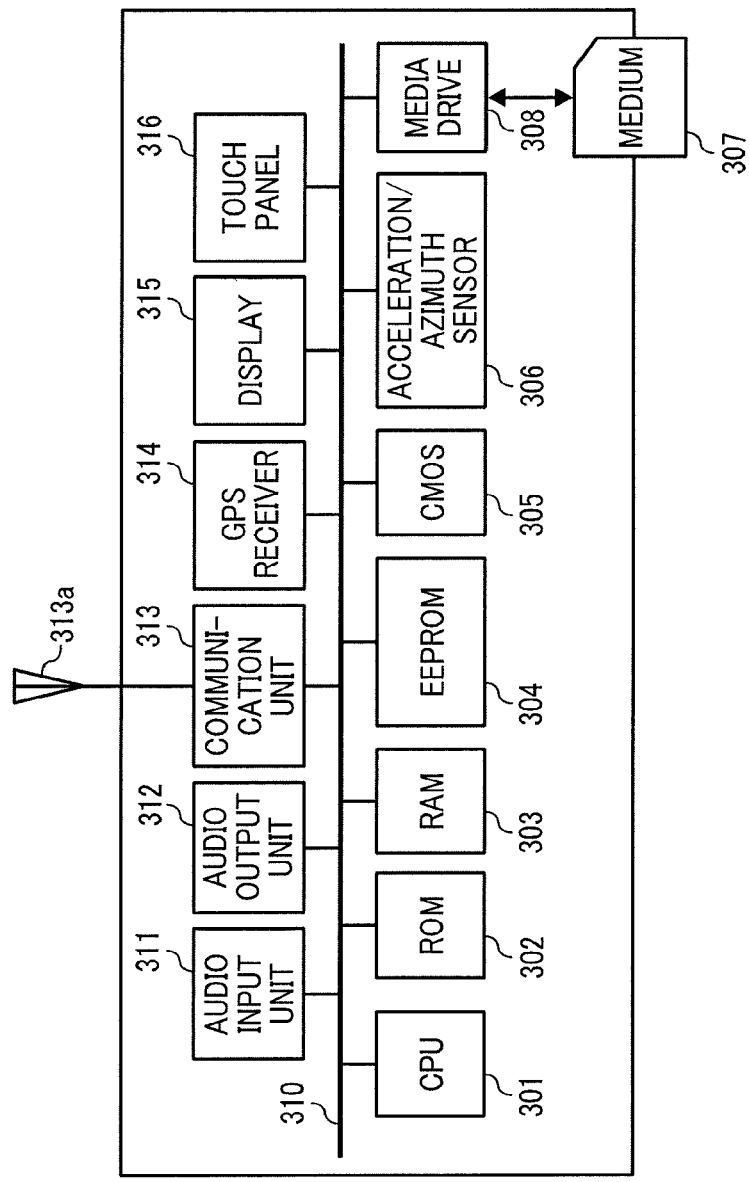
FIG. 10 is a block diagram illustrating a hardware configuration of the first communication terminal of FIG. 8 according to an embodiment of the present invention.

FIG. 10 is a block diagram illustrating a hardware configuration of the communication terminal 3. As illustrated in FIG. 10, the communication terminal 3 includes a CPU 301, a ROM 302, a RAM 303, an electrically erasable programmable ROM (EEPROM) 304, a CMOS sensor 305, an acceleration/azimuth sensor 306, and a media drive 308. The CPU 301 controls entire operation of the communication terminal 3. The ROM 302 stores basic input/output programs. The CPU 301 uses the RAM 302 as a work area when executing programs or processing data. The EEPROM 304 performs data reading and writing under control of the CPU 301. The CMOS sensor 305 is an image pickup device that captures an image of an object to obtain image data under control of the CPU 301. Examples of the acceleration/azimuth sensor 306 include an electromagnetic compass and a gyrocompass, each detecting terrestrial magnetism, and an acceleration sensor. The media drive 308 controls reading and writing (storing) of data from and to a recording medium 307 such as a flash memory. The recording medium 307 is removably mounted to the media drive 308. Accordingly, under control of the media drive 308, data recorded in the recording medium 307 is read from the recording medium 307 and new data is written (stored) into the recording medium 307.

The EEPROM 304 stores an operating system (OS) for execution by the CPU 301, other programs, and various data. Instead of the CMOS sensor 305, a CCD sensor may be used.

Further, the communication terminal 3 includes an audio input unit 311, an audio output unit 312, an antenna 313a, a communication unit 313, a global positioning systems (GPS) receiver 314, a display 315, a touch panel 316, and a bus line 320. The audio input unit 311 converts sound to audio signals. The audio output unit 312 converts audio signals to sound. The communication unit 313, which is implemented by, for example, an interface circuit, communicates data with a nearest base station and the like by wireless communication signals using the antenna 313a. The GPS receiver 314 receives GPS signals containing a position information of the communication terminal 3 with GPS satellites or an indoor Messaging system as indoor GPS. This position information of communication terminal 3 is represented by, for example, a latitude, longitude, and altitude. The display 315 displays, for example, an image of an object and various icons. Examples of the display 315 include a liquid crystal display and an organic electro luminescence display. Examples of the touch panel 316 include a pressure-sensitive panel and an electrostatic panel. The touch panel 316 mounted on the display 315 detects a position on the display 315 touched by a finger, a stylus, and the like. The bus line 310 electrically connects those parts or devices of the communication terminal 3 to each other. Examples of the bus line 320 include an address bus and a data bus.

The audio input unit 311 includes a microphone for collecting sound. The audio output unit 312 includes a speaker to output sound.

Hereinafter, a description is given of hardware configurations of the image management system 5 and the communication terminal 7, which in this embodiment is implemented by a laptop computer, with reference to FIG. 14. FIG. 11 is a block diagram illustrating a hardware configuration of any one of the image management system 5 and the communication terminal 7. In this embodiment, both the image management system 5 and the communication terminal 7 are implemented by a computer. Therefore, a description is given of a configuration of the image management system 5, and the description of a configuration of the communication terminal 7 is omitted, having the same or substantially same configuration as that of the image management system 5.

The image management system 5 includes a CPU 501, a ROM 502, a RAM 503, an HD 504, a hard disc drive (HDD) 505, a media drive 507, a display 508, a network I/F 509, a keyboard 511, a mouse 512, a compact-disc read only memory (CD-ROM) drive 514, and a bus line 510. The CPU 501 controls entire operation of the image management system 5. The ROM 502 stores programs such as an initial program loader to boot the CPU 501. The CPU 501 uses the RAM 503 as a work area when executing programs or processing data. The HD 504 stores various data such as programs for the image management system 5. The HDD 505 controls reading and writing of data from and to the HD 504 under control of the CPU 501. The media drive 507 controls reading and writing (storing) of data from and to a recording medium 506 such as a flash memory. The display 508 displays various information such as a cursor, menus, windows, characters, or images. The network I/F 509 communicates data with another apparatus such as the communication terminal 3 and the communication terminal 7 via the communication network 9. The keyboard 511 includes a plurality of keys to allow a user to input characters, numbers, and various instructions. The mouse 512 allows a user to input an instruction for selecting and executing various functions, selecting an item to be processed, or moving the cursor. The CD-ROM drive 514 controls reading and writing of data from and to a CD-ROM 513 as an example of a removable recording medium. The bus line 510 electrically connects those parts or devices of the image management system 5 to each other as illustrated in FIG. 14. Examples of the bus line 510 include an address bus and a data bus.

Figure 15:
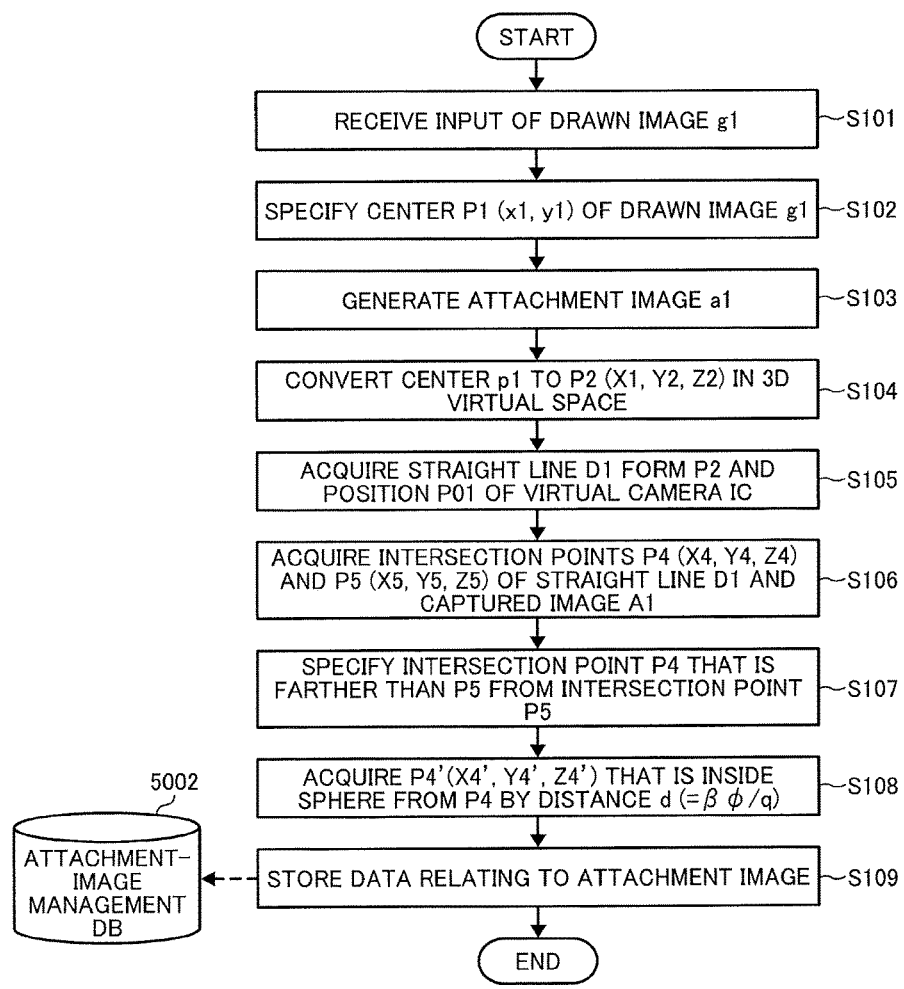
FIG. 15 is a flowchart illustrating an operation of deriving a position at which the attachment image is to be attached in the captured image according to an embodiment of the present invention.

Hereinafter, a description is given of a functional configuration of the image communication system 10 according to this embodiment. FIG. 15 is a block diagram illustrating functional configurations of the image capturing device 1, the communication terminal 3, the image management system 5, and the communication terminal 7, which constitute a part of the image communication system 10 according this embodiment. In the image communication system 10 illustrated in FIG. 12, the image management system 5 communicates data with the communication terminal 3 and communication terminal 7 via the communication network 9.

Figure 12:
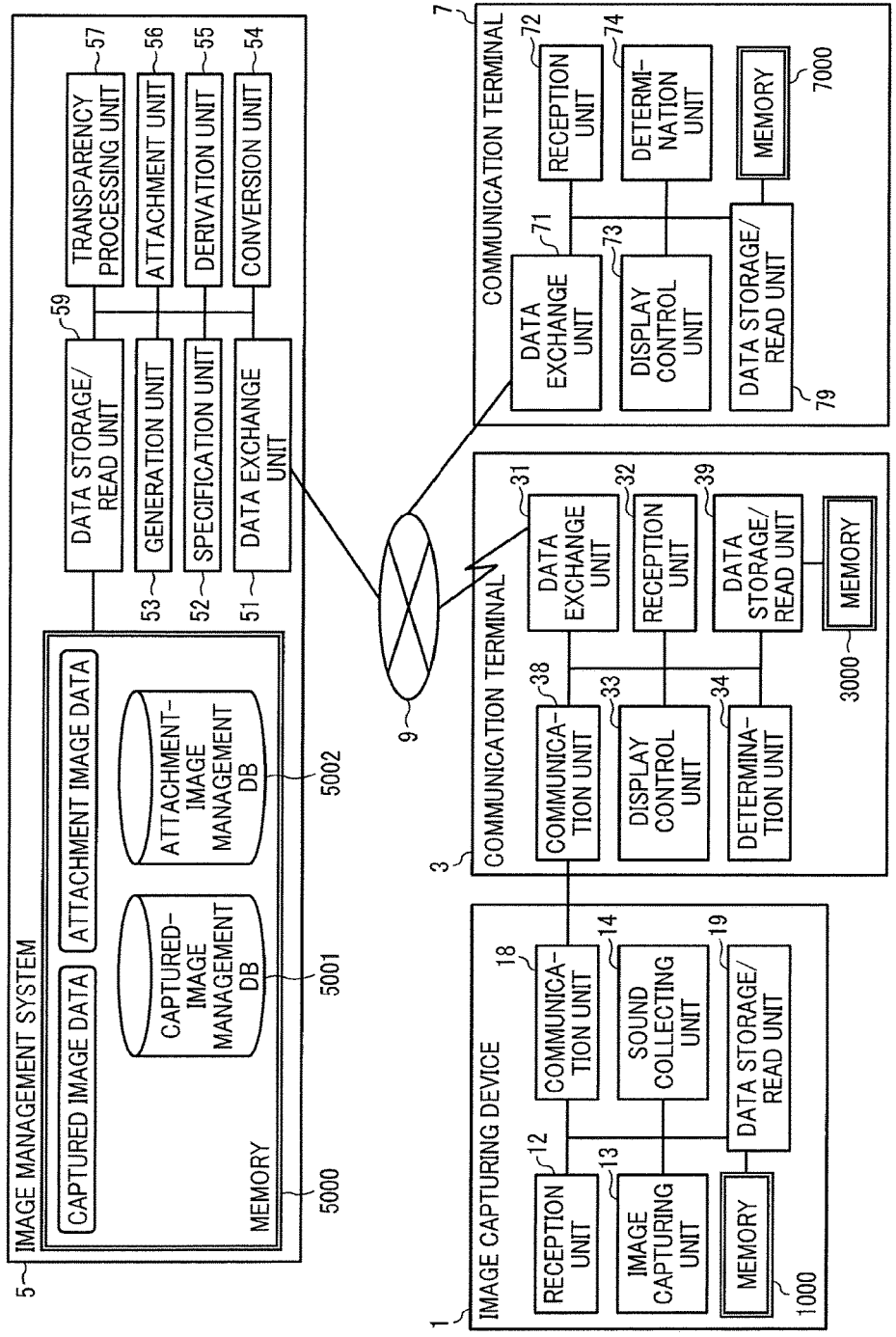
FIG. 12 is a block diagram illustrating a functional configuration of the image communication system of FIG. 8 according to an embodiment of the present invention.

As illustrated in FIG. 12, the image capturing device 1 includes a reception unit 12, an image capturing unit 13, a sound collecting unit 14, a communication unit 18, and a data storage/read unit 19. These functional blocks 12 to 19 are implemented by one or more hardware components illustrated in FIG. 9, when operating in accordance with instructions from the CPU 111 executing according to the program for the image capturing device 1, loaded onto the DRAM 114 from the SRAM 113.

The image capturing device 1 further includes a memory 1000, which is implemented by the ROM 112, the SRAM 113, or the DRAM 114 illustrated in FIG. 9.

Hereinafter, a detailed description is given of these functional blocks 12 to 19 of the image capturing device 1 with reference to FIGS. 9 and 12.

The reception unit 12 of the image capturing device 1 is implemented by the operation unit 115 and the CPU 111, which operate in cooperation with each other, to receive an instruction input from the operation unit 115 according to a user (the photographer X) operation.

The image capturing unit 13 is implemented by the imaging unit 101, the image processor 104, the imaging controller 105, and the CPU 111, which operate in cooperation with each other, to capture an image of the surroundings and acquire the captured-image data.

The sound collecting unit 14 is implement by the microphone 108 and the sound processor 109, when operating under control of the CPU 111, to collect sounds around the image capturing device 1.

The communication unit 18 is implemented by the CPU 111, when executing according to the program loaded onto the DRAM 114, to communicate data with a communication unit 38 of the communication terminal 3 by a near distance wireless communication such as NFC, Bluetooth (registered trademark), and Wi-Fi.

The data storage/read unit 19 is implement by the CPU 111, when executing according to the program loaded onto the DRAM 114, to store data or information in the memory 1000 and read out data or information from the memory 1000.

As illustrated in FIG. 12, the communication terminal 3 includes a data exchange unit 31, a reception unit 32, a display control unit 33, a determination unit 34, a communication unit 38, and a data storage/read unit 39. These functional blocks 31 to 39 are implemented by one or more hardware components illustrated in FIG. 10, when operating in accordance with instructions from the CPU 301 executing according to the programs for the communication terminal 3, loaded onto the RAM 303 from the EEPROM 304.

The communication terminal 3 further includes a memory 3000, which is implemented by the ROM 302, the RAM 303, and the EEPROM 304 illustrated in FIG. 10.

Hereinafter, a detailed description is given of these functional blocks 31 to 39 with reference to FIGS. 10 and 12.

The data exchange unit 31 of the communication terminal 3 is implemented by the communication unit 313 illustrated in FIG. 10, when operating under control of the CPU 301, to exchange data with the image management system 5 via the communication network 9.

The reception unit 32 is implement by the touch panel 316, when operating under control of the CPU 301, to receive an instruction from a user, e.g., the photographer X in FIG. 8.

The display control unit 33 is implemented by the CPU 301, when executing according to the program loaded onto the RAM 303, to control the display 315 to display images or characters.

The determination unit 34 is implemented by the CPU 301, when executing according to the program loaded onto the RAM 303, to perform various determination.

The communication unit 38 is implemented by the CPU 301, when executing according to the program loaded onto the RAM 303, to communicate data with the communication unit 18 of the image capturing device 1 by a near distance wireless communication such as NFC, Bluetooth, and Wi-Fi.

The data storage/read unit 39 is implement by the CPU 301, when executing according to the program loaded onto the RAM 303, to store data or information in the storage 3000 and read out data or information from the memory 3000.

Hereinafter, a description is given of a functional configuration of the image management system 5 with reference to FIGS. 11 and 12. The image management system 5 includes a data exchange unit 51, a specification unit 52, a generation unit 53, a conversion unit 54, a derivation unit 55, an attachment unit 56, a transparency processing unit 57, and a data storage/read unit 59. These functional blocks 51, to 59 are implemented by one or more hardware components illustrated in FIG. 11, when operating in accordance with instructions from the CPU 501 executing according to the programs for the image management system 5, loaded onto the RAM 503 from the HD 504.

Figure 11:
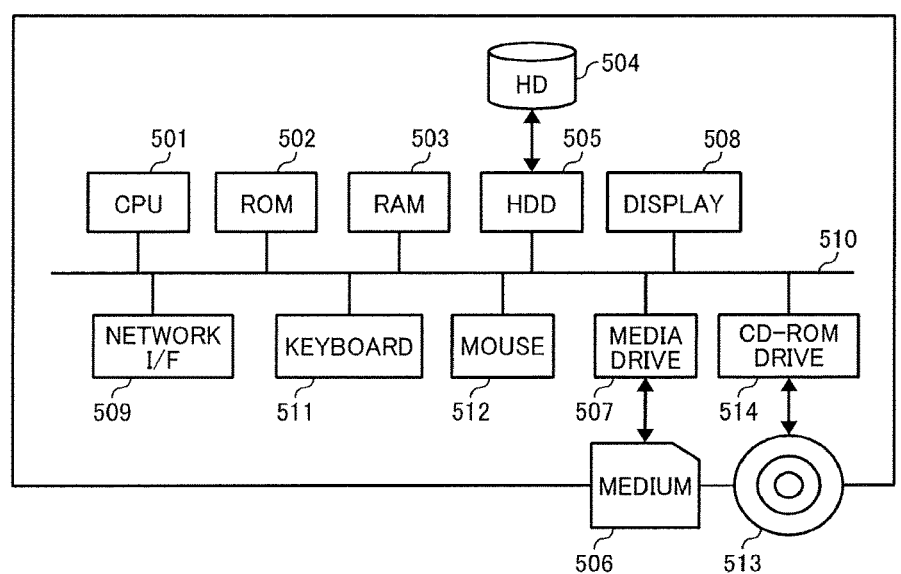
FIG. 11 is a block diagram illustrating a hardware configuration of any one of the image management system and the second communication terminal of FIG. 8 according to an embodiment of the present invention.

The image management system 5 further includes a memory 5000, which is implemented by the RAM 503 and the HD 504 illustrated in FIG. 11. The memory 5000 includes a captured-image management DB 5001 and an attachment image management DB 5002. A captured-image management table illustrated in FIG. 13 constitutes the captured-image management DB 5001. Further, an attachment-image management table illustrated in FIG. 14 constitutes the attachment image management DB 5002.

FIG. 13 is an example of the captured-image management table. The captured-image management table stores a user ID, a captured-image ID, a file name of the captured-image data, and a capturing date and time in association with one another. The user ID is an example of user identification information for identifying a photographer. The captured-image ID is an example of captured-image identification information for identifying a captured-image data (full spherical panoramic image). The capturing date and time indicates the date and time when the photographer takes an image to acquire the captured-image.

FIG. 14 is an example of the attachment-image management table. Hereinafter, a description is given using a coordinate (X, Y, Z) in a three-dimensional virtual space. The attachment-image management table stores a captured-image ID, an attachment-image ID, a file name of the attachment-image data, an attachment position, a reference position, and a size of the attachment image in association with one another. The attachment-image ID is an example of attachment-image identification information for identifying an attachment image. The attachment position indicates a position at which the attachment image is to be attached in the captured image (full spherical panoramic image) in the three-dimensional virtual space. The reference position indicates an initial position of the virtual camera IC in the three-dimensional virtual space. In other words, the reference position indicates the position of the initial point of view in the three-dimensional virtual space.

Hereinafter, a detailed description is given of the functional blocks 51 to 59 of the image management system 5 with reference to FIGS. 11 and 12.

The data exchange unit 51 of the image management system 5 is implemented by the network I/F 509 illustrated in FIG. 11, when operating under control of the CPU 501. The data exchange unit 51 exchanges data or information with the communication terminal 3 or the communication terminal 7 via the communication network 9.

The specification unit 52 is implemented by the CPU 501 illustrated in FIG. 11, when executing according to the program loaded onto the RAM 503. The specification unit 52 specifies a center p (x1, y1) of a drawn-image g1 in a two-dimensional drawing area. The generation unit 53 is implemented by the CPU 501 illustrated in FIG. 11, when executing according to the program loaded onto the RAM 503. The generation unit 53 generates an attachment image a1 containing the drawn-image g1 with a center of the attachment image a1 being at p1 specified by the specification unit 52 in the two-dimensional drawing area.

The conversion unit 54 is implemented by the CPU 501 illustrated in FIG. 11, when executing according to the program loaded onto the RAM 503. The conversion unit 54 converts the center p1 specified by the specification unit 52 in the two-dimensional drawing area to a specific position in the three-dimensional virtual space. For example, the conversion unit 54 converts the center p1 to a point P2 (X2, Y2, Z2) in the three-dimensional virtual space.

The derivation unit 55 is implemented by the CPU 501 illustrated in FIG. 11, when executing according to the program loaded onto the RAM 503. The derivation unit 55 derives a straight line D1 passing through the two points, i.e., the specific position (for example, the point P2) converted by the conversion unit 54 and the position P01 of the virtual camera IC in the three-dimensional virtual space.

The attachment unit 56 is implemented by the CPU 501 illustrated in FIG. 11, when executing according to the program loaded onto the RAM 503. The attachment unit 56 attaches the attachment image along the normal of the straight line D1 at a specific point on the straight line D1 in the three-dimensional virtual space.

The transparency processing unit 57 is implemented by the CPU 501 illustrated in FIG. 11, when executing according to the program loaded onto the RAM 503. The transparency processing unit 57 makes portions in the attachment image other than the drawn-image transparent.

The data storage/read unit 59 is implement by the HDD 505, when operating under control of the CPU 501, to store data or information in the memory 5000 and read out data or information from the memory 5000.

Hereinafter, a description is given of a functional configuration of the communication terminal 7 with reference to FIGS. 11 and 13. The communication terminal 7 includes a data exchange unit 71, a reception unit 72, a determination unit 74, a display control unit 73, and a data storage/read unit 79. These functional blocks 71 to 74, and 79 are implemented by one or more hardware components illustrated in FIG. 11, when operating in accordance with instructions from the CPU 501 executing according to the programs for the communication terminal 7, loaded onto the RAM 503 from the HD 504.

The communication terminal 7 further includes a memory 7000, which is implemented by the RAM 503 and the HD 504 illustrated in FIG. 11.

Hereinafter, a detailed description is given of these functional blocks 71 to 74 and 79 with reference to FIG. 13.

The data exchange unit 71 of the communication terminal 7 is implemented by the network I/F 509 illustrated in FIG. 11, when operating under control of the CPU 501. The data exchange unit 71 exchanges data or information with image management system 5 via the communication network 9.

The reception unit 72 is implement by the keyboard 511 and the mouse 512, when operating under control of the CPU 111, to receive an instruction from a user, e.g., the viewer in FIG. 8.

The display control unit 73 is implemented by the CPU 501 illustrated in FIG. 11, when executing according to the program loaded onto the RAM 503, to control the display 508 of the communication terminal 7 to display images.

The determination unit 74 is implemented by the CPU 301, when executing according to the program loaded onto the RAM 303, to perform various determination.

The data storage/read unit 79 is implement by the HDD 505, when operating under control of the CPU 501, to store data or information in the memory 7000 and read out data or information from the memory 7000.

Hereinafter, a description is given of operations performed by the image management system with reference to FIGS. 15 to 27. In the following embodiment, the image management system 5 causes the communication terminal 7 to display a captured image, which is transmitted from the communication terminal 3 via the communication network 9.

Figure 16:
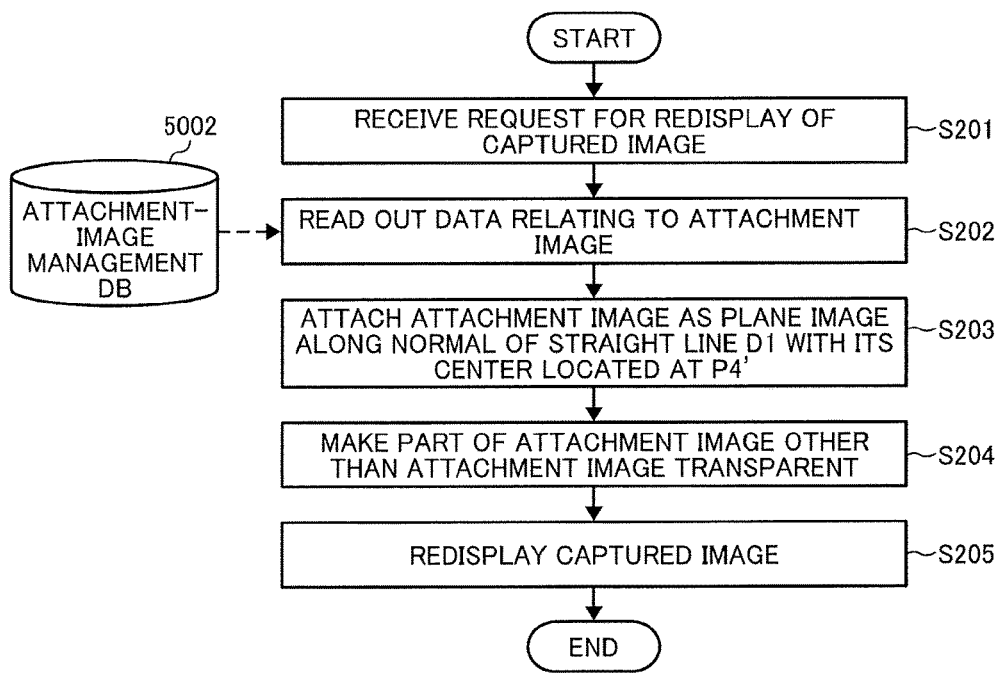
FIG. 16 is a flowchart illustrating an operation of attaching the attachment image to the captured image according to an embodiment of the present invention.

Specifically, FIG. 15 is a flowchart illustrating an operation of deriving an attachment position, at which the attachment image is to be attached in the captured image. Further, FIG. 16 is a flowchart illustrating an operation of attaching the attachment image to the captured image. In each of FIGS. 17 to 25, (a) illustrates the two-dimensional (x, y) drawing area in the image management system 5 and the communication terminal 7, while (b) illustrates the three-dimensional (X, Y, Z) virtual space in the image management system 5.

Figure 25:
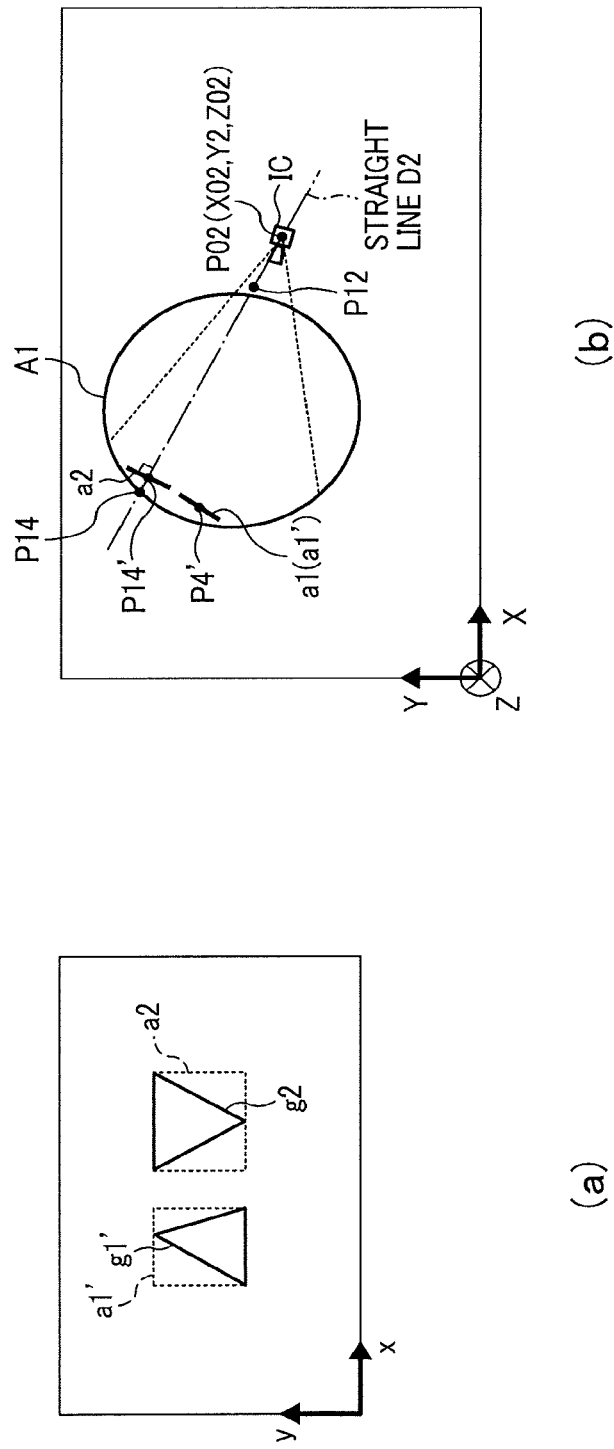
FIG. 25 illustrates a two-dimensional drawing area in each of the image management system and the second communication terminal according to an embodiment of the present invention in (a), and a three-dimensional virtual space in the image management system according to an embodiment of the present invention in (b)
Figure 26A:
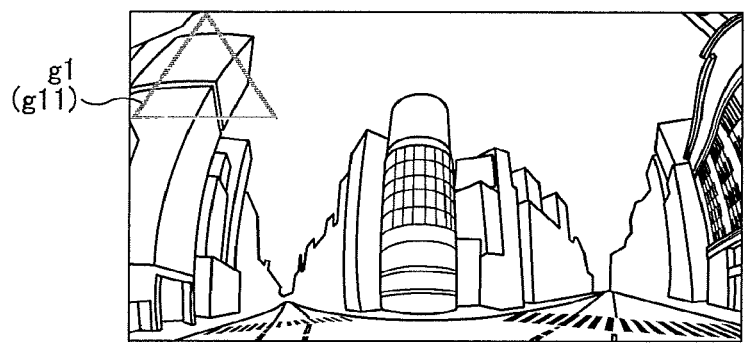
FIG. 26A illustrates a drawn-image in the predetermined-area image when a distortion correction process and a transparency process have been performed on the drawn-image according to an embodiment of the present invention.

(a) of FIGS. 17 to 25 each illustrates the drawing area of the attachment image in the predetermined-area image while omitting other buildings and surroundings as illustrated in FIG. 26A, in order to make the attachment image a1 containing the drawn image g1 easy to see. The display control unit 73 of the communication terminal 7 has a browser function. This browser function provides the two-dimensional drawing area in both the image management system 5 and the communication terminal 7 as illustrated in (a) of FIGS. 17 to 25. In other words, image data that is input to the drawing area by the viewer Y using the communication terminal 7 is transmitted to the image management system 5. In response to receiving the input image data from the communication terminal 7, the image management system 5 performs processing on the input image data to transmit the processed image data to the communication terminal 7. The communication terminal 7 renders and displays the drawn-image g1 as illustrated in FIG. 26A on the display 508 based on the processed image data transmitted from the image management system 5. In addition, (b) of FIGS. 17 to 25 each illustrates a case in which the virtual camera IC is outside the captured image.

First, with reference to FIG. 15 and FIGS. 17 to 22, a description is given hereinafter of an operation of deriving an attachment position P4' at which the attachment image is to be attached in the captured image (full spherical panoramic image) in a case in which the viewer Y draws the drawn-image g1 on the predetermined-area image as illustrated in FIG. 26A.

Figure 17:
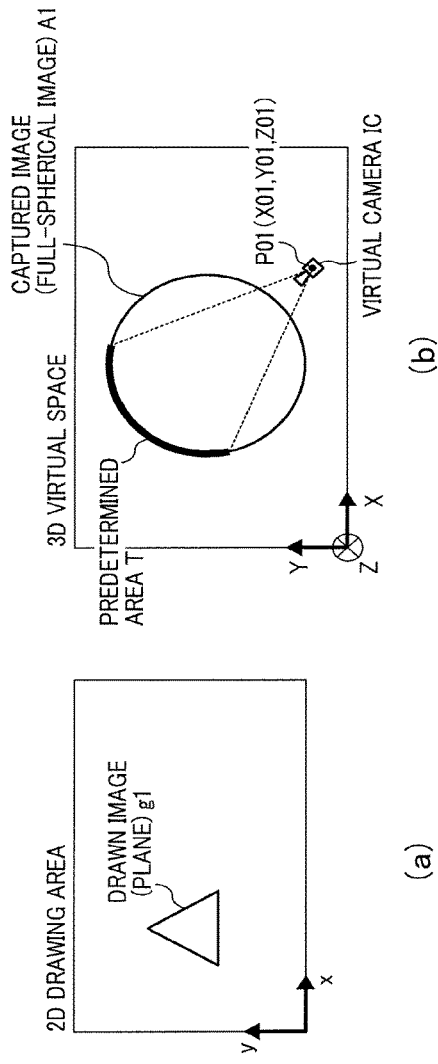
FIG. 17 illustrates a two-dimensional drawing area in each of the image management system and the second communication terminal according to an embodiment of the present invention in (a), and a three-dimensional virtual space in the image management system according to an embodiment of the present invention in (b)

When, as illustrated in (a) of FIG. 17, the viewer Y draws a predetermined drawn-image g1 (a regular triangle, in this example) in the two-dimensional drawing area displayed at the communication terminal 7, the reception unit 72 receives the input of drawing. Subsequently, the data exchange unit 71 transmits an instruction for drawing to the data exchange unit 51 of the image management system 5 (S101). At this point of time when the reception unit 72 receives the input of drawing, the specification unit 52 of the image management system 5 already specifies the position of the captured image A1, which is the full spherical panoramic image, the reference position P01 (X01, Y01, Z01) of the virtual camera IC, and the predetermined area T in the three-dimensional virtual space, as illustrated in (b) of FIG. 17. Note that the reference position P01 of the virtual camera IC corresponds to the point of view from which the predetermined area T is within a field of view. In (b) of FIG. 18 and the subsequent drawings, the predetermined area T is omitted in order to make the drawings simple.

Figure 18:
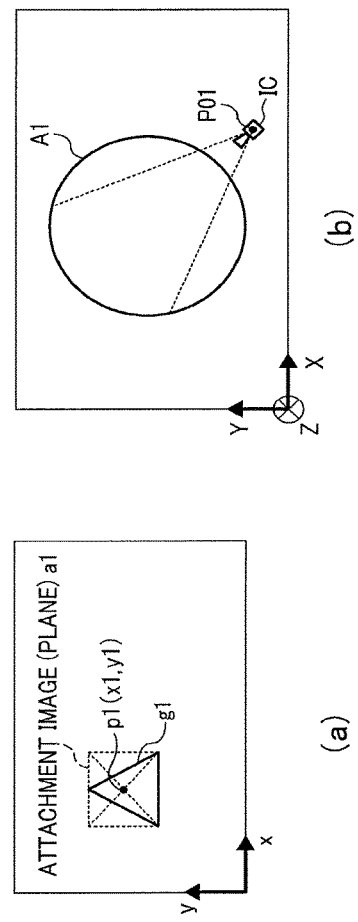
FIG. 18 illustrates a two-dimensional drawing area in each of the image management system and the second communication terminal according to an embodiment of the present invention in (a), and a three-dimensional virtual space in the image management system according to an embodiment of the present invention in (b)

Next, as illustrated in (a) of FIG. 18, the generation unit 53 of the image management system 5 specifies the center p1 (x1, y1) of the drawn-image g1 (S102). Note that the center p1 is not visually displayed, while the drawn-image g1 is visually displayed. Further, the generation unit 53 generates the attachment image a1 containing the drawn-image g1 with a center of the attachment image a1 being at p1 (S103). Note that the attachment image a1 is not visually displayed, while the drawn-image g1 is visually displayed. At this point of time when the generation unit generates the attachment image a1 (S103), the status in the three-dimensional virtual space is unchanged as illustrated in (b) of FIG. 18.

Figure 19:
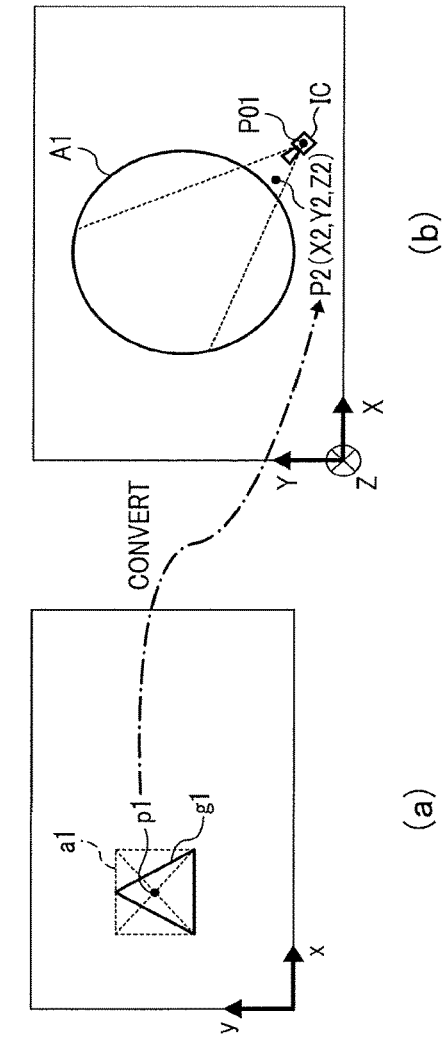
FIG. 19 illustrates a two-dimensional drawing area in each of the image management system and the second communication terminal according to an embodiment of the present invention in (a), and a three-dimensional virtual space in the image management system according to an embodiment of the present invention in (b)
Figure 20:
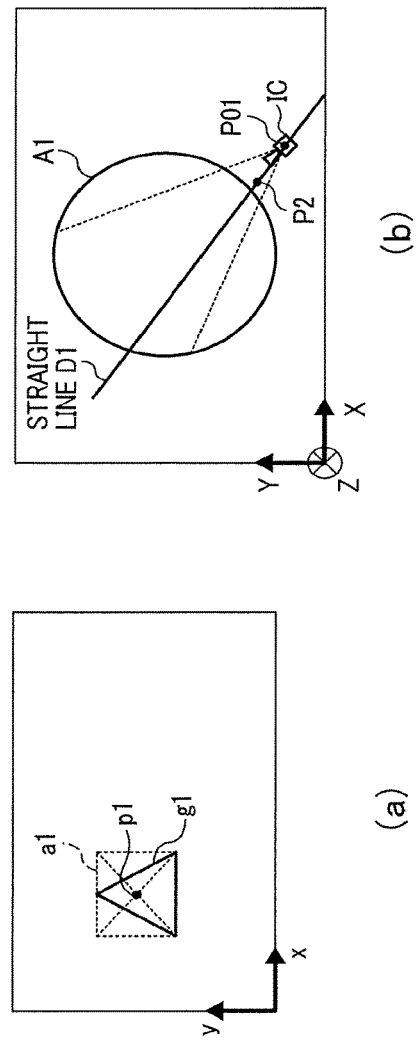
FIG. 20 illustrates a two-dimensional drawing area in each of the image management system and the second communication terminal according to an embodiment of the present invention in (a), and a three-dimensional virtual space in the image management system according to an embodiment of the present invention in (b)

Thereafter, the conversion unit 54 converts the center p1 in the two-dimensional drawing area illustrated in (a) of FIG. 19 to the specific position in the three-dimensional virtual space. In this example, the conversion unit 54 converts the center p1 to the point P2 (X2, Y2, Z2) in the three-dimensional virtual space as illustrated in (b) of FIG. 19 (S104). Subsequently, as illustrated in (b) of FIG. 20, the derivation unit 55 derives the straight line D1 passing through the two points, i.e., the point P2 and the position P01 of the virtual camera IC (S105). At this point of time when the derivation unit 55 derives the straight line D1 (S105), the status in the two-dimensional drawing area is unchanged as illustrated in (a) of FIG. 20.

Figures 21, 22:
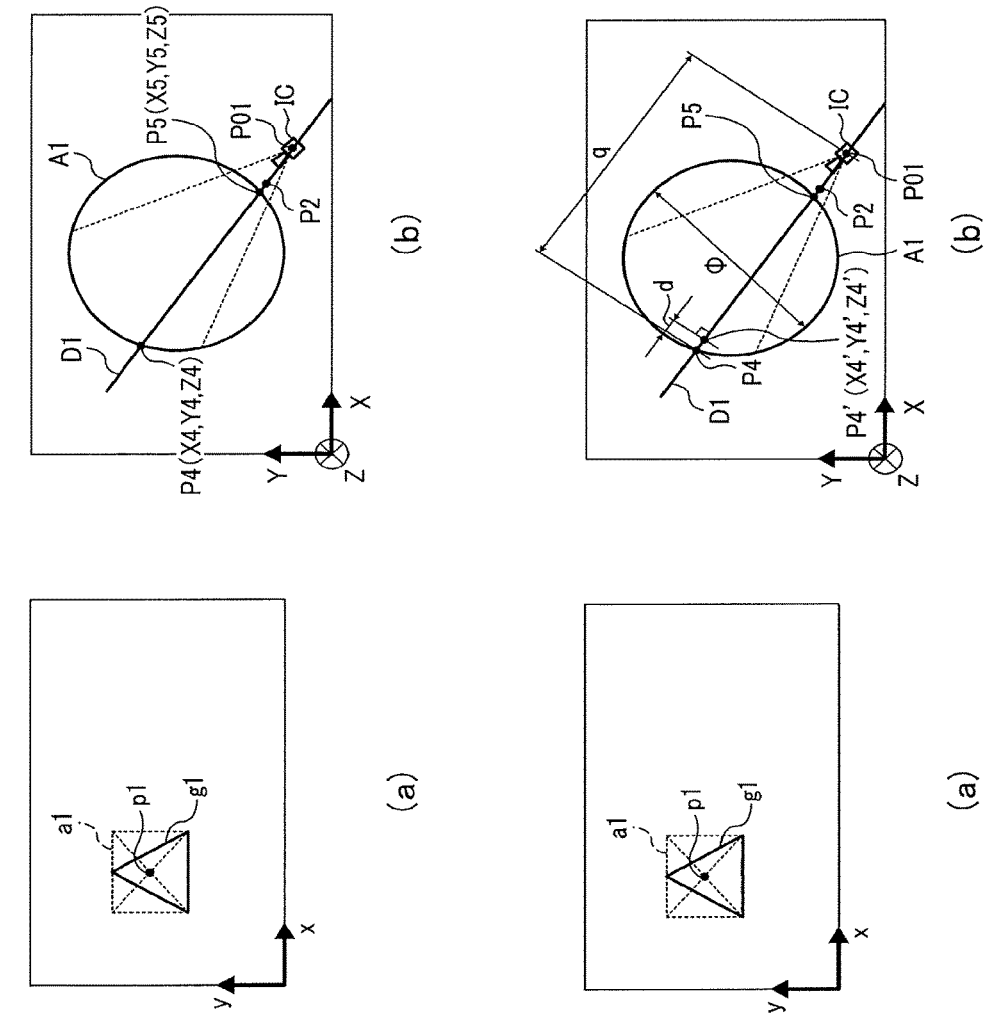
FIG. 21 illustrates a two-dimensional drawing area in each of the image management system and the second communication terminal according to an embodiment of the present invention in (a), and a three-dimensional virtual space in the image management system according to an embodiment of the present invention in (b)
FIG. 22 illustrates a two-dimensional drawing area in each of the image management system and the second communication terminal according to an embodiment of the present invention in (a), and a three-dimensional virtual space in the image management system according to an embodiment of the present invention in (b)

Thereafter, as illustrated in (b) of FIG. 21, the derivation unit 55 derives two intersection points P4 (X4, Y4, Z4) and P5 (X5, Y5, Z5) of the straight line D1 and the captured image A1 (S106). The distance between the intersection point P4 and the virtual camera IC is longer than the distance between the intersection point P5 and the virtual camera IC. Further, the specification unit 52 specifies the intersection point P4, which is farther from the virtual camera IC than the intersection point P5 (S107). At this point of time when the specification unit 52 specifies the intersection point P4 (S107), the status in the two-dimensional drawing area is unchanged as illustrated in (a) of FIG. 21.

Thereafter, as illustrated in (b) of FIG. 22, the derivation unit 55 derives a point P4' (X4', Y4', Z4'), which is a position obtained by moving the intersection point P4 to the inner side of the solid sphere of the full spherical panoramic image by a distance d (=βφ/q) along the straight line D1 (S108). In the above equation, β denotes a constant, φ denotes a radius of the solid sphere, and q denotes a straight line distance between the position P01 of the virtual camera and the intersection point P4. At this point of time when the derivation unit 55 derives the point P4' (S108), the status in the two-dimensional drawing area is unchanged as illustrated in (a) of FIG. 22. The reason why the attachment image a1 is attached to the full spherical panoramic image at a position closer to the inner side of the solid sphere by the distance d, is because, as illustrated in FIG. 26A, it turned out by experiment that a drawn-image g11 in the attachment image a1 is displayed with clarity close to that of the drawn-image g1 originally drawn at S101. In other words, the drawn-image g1 is drawn and data relating to the attachment image a1 is stored at S109 described below. Thereafter, each data relating the attachment image a1 is read out, and the attachment image a1 is attached to the captured image A1 at S201 and the subsequent steps described below. In this case, the drawn-image g11 in the attachment image a1 is displayed with clarity close to that of the drawn-image g1.

Next, the data storage/read unit 59 stores the data relating to the attachment image a1 in the attachment-image management table (see FIG. 14) (S109). Specifically, the data storage/read unit 59 associates the parameters X, Y, and Z of the point P4' in the field of the attachment position with the captured-image ID, the attachment-image ID, and the file name of the attachment-image data. Further, the data storage/read unit 59 associates the parameters X, Y, and Z of the position P01 in the field of the reference position with the captured-image ID, the attachment-image ID, and the file name of the attachment-image data. Furthermore, the data storage/read unit 59 associates a parameter of the size of the attachment image a1 in the field of the size of the attachment image with the captured-image ID, the attachment-image ID, and the file name of the attachment-image data. The reason why the attachment-image management table stores not only the attachment position but also the reference position is because the drawn-image g11 having the same or substantially the same shape as that of the drawn-image g1 is displayed as illustrated in FIG. 26A, in a case in which once the drawn-image g1 is drawn and the data relating to the attachment image a1 is stored at S109, and thereafter the data relating the attachment image a1 is read out and the attachment image a1 is attached to the captured image A1 at S201 and the subsequent steps described below. By contrast, if the attachment-image management table stores only the attachment position and does not store the reference position, the normal of the straight line D1 is indefinite even when the point P4' is defined. This may cause the drawn-image g11 illustrated in FIG. 26A that is displayed based on the read-out data to have a different shape from that of the drawn-image g1 drawn at S101.

After S109, the viewer Y instructs the end of display of the predetermined-area image (captured image) in which the drawn-image g1 is rendered illustrated in FIG. 26A.

Hereinafter, a description is given of processing of attaching the attachment image a1 to the captured image A1 to display the predetermined-area image (captured image) as illustrated in FIG. 26A again at the communication terminal 7 in accordance with an instruction input by the viewer Y.

At first, the reception unit 72 receives an instruction for redisplaying the captured image from the user in accordance the operation to the keyboard 511 or the mouse 512 (S201). Subsequently, the data exchange unit 71 transmits the instruction for redisplaying the captured image to the data exchange unit 51 of the image management system 5. In this case, the data exchange unit 71 also transmits the capture-image ID corresponding to the captured image to be redisplayed.

Next, the data storage/read unit 59 of the image management system 5 searches the attachment-image management table (see FIG. 14) with the captured-image ID as a retrieval key to read out the corresponding data. Specifically, the data storage/read unit 59 reads out the captured-image ID, the file name of the attachment-image data, the attachment position, the reference position, and the size of the attachment image, each being associated with the captured-image ID (S202).

Thereafter, as illustrated in (b) of FIG. 23, the attachment unit 56 attaches the attachment image a1 at the point P4' on the straight line D1 along the normal of the straight line D1 based on the data that is read out at S202 (S203). Thus, as illustrated in (a) of FIG. 23, the attachment image a1 as illustrated in FIG. 22 containing the drawn-image g11 having the same shape as that of the drawn-image g1 that is originally drawn is attached to the captured image A1.

Thereafter, the transparency processing unit 57 makes portions in the attachment image a1 other than the drawn-image g11 transparent (S204). Subsequently, the data exchange unit 51 transmits data of the captured image to which the attachment image a1 is attached by the operations from S201 to S204. Accordingly, the display control unit 73 of the communication terminal 7 displays, on the display 508, the predetermined-area image containing the drawn-image g11 as illustrated in FIG. 26A (S205).

With configurations and operations as described above, in response to a user (viewer Y) instruction for redisplaying the captured image, the captured-image containing the drawn-image g11 having the same shape as that of the drawn-image g11 that is originally drawn is redisplayed.

Figure 26B:
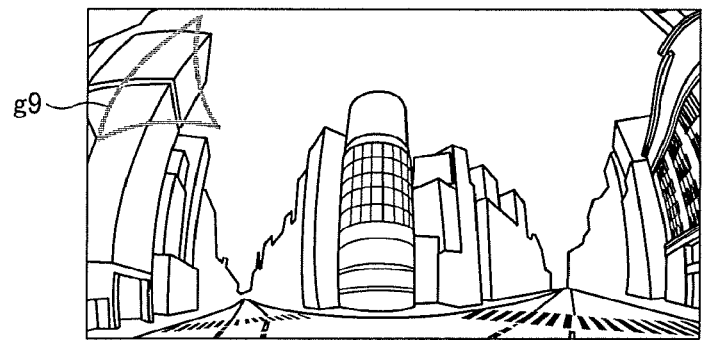
FIG. 26B illustrates the draw-image in the predetermined-area image when a distortion correction process has not performed on the drawn-image and a transparency process has been performed on the drawn-image according to an embodiment of the present invention.
Figure 27A:
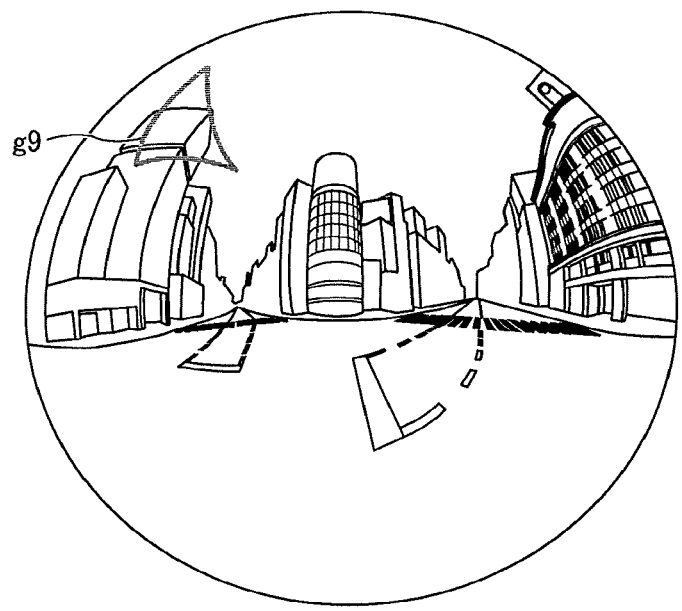
FIG. 27A illustrates the draw-image in the full spherical panoramic image when a distortion correction process has not performed on the drawn-image and a transparency process has been performed on the drawn-image according to an embodiment of the present invention.
Figure 27B:
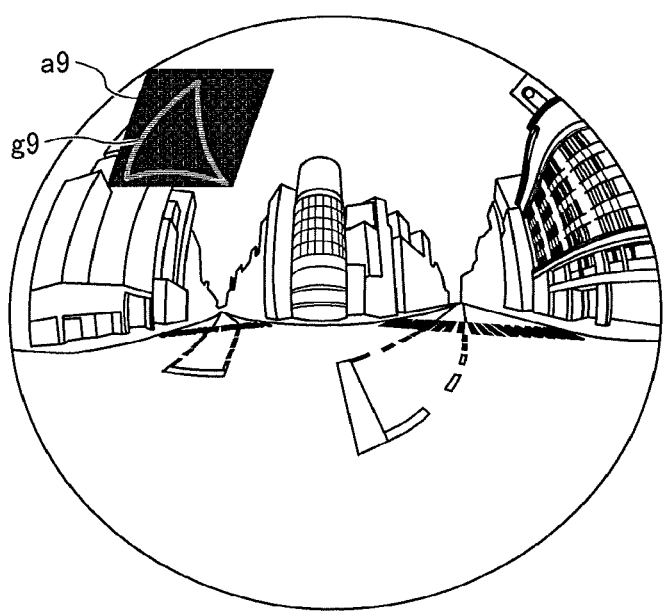
FIG. 27B illustrates the draw-image in the full spherical panoramic image when neither a distortion correction process nor a transparency process has been performed on the drawn-image according to an embodiment of the present invention.

FIG. 26A illustrates an example of the predetermined-area image on which the distortion correction process of S203 and the transparency process of S204 have been performed. By contrast, FIG. 26B illustrates an example of the predetermined-area image on which the distortion correction process of S203 has not been performed and the transparency process of S204 has been performed. Further, FIG. 27A illustrates an example of the full spherical panoramic image on which the distortion correction process of S203 has not been performed and the transparency process of S204 has been performed. Furthermore, FIG. 27B illustrates an example of the full spherical panoramic image on which neither the distortion correction process of S203 nor the transparency process of S204 has been performed.

In addition, as illustrated in (a) of FIG. 24, when the predetermined-area image is moved in a direction indicated by arrow (to left side) at the communication terminal 7 in accordance with the viewer Y's instruction, the virtual camera IC is moved from the position P01 to P02 in the three-dimensional virtual space as illustrated in (b) of FIG. 24. In this case, as the attachment image a1 is viewed from the point of view P02, the drawn-image g1 is deformed to the drawn-image g' as illustrated in (a) of FIG. 24.

Furthermore, as illustrated in (a) of FIG. 25, when a new drawn-image a2 is drawn, an attachment image a2 is attached to the captured image at a point P14' on a new straight line D2 along the normal of the straight line D2 as illustrated in (b) of FIG. 25. The straight line D2, the point P02, a point P12, a point P14, and the point P14' respectively correspond to the straight line D1, the point P01, the point P2, the point P4, and the point P4'.

As described heretofore, according to this embodiment, the attachment image a1 is attached to the captured image A1 as a planar image without being curved. Accordingly, as illustrated in FIG. 26A, when the viewer Y views the captured image (the predetermined-area image) again at the communication terminal 7, the drawn-image g11 having the same shape as that of the drawn-image g1 that is originally drawn is displayed. In other words, the drawn-image g9 that is curved as illustrated in FIG. 26B is not displayed. Accordingly, the redisplayed drawn-image g11 has an appearance of the image originally drawn by the user.

The image management system 5 is implemented by either a single computer or a plurality of computers, each including or performing at least a part of the functional blocks, operations, or memories of the image management system 5 as described above.

A recording medium such as a CD-ROM storing the programs in the above embodiment and the HD 504 storing those programs may be distributed domestically or internationally as a program product.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

For example, any one of the functions performed by the image management system 5 may be performed by the communication terminal 7. For example, attaching the attachment image having the drawn image in planar image, to the captured image for display, may be performed by the communication terminal 7, based on calculation performed by the image management system 5.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

In case the present invention is implemented as computer software implemented by one or more networked processing apparatuses, the network can comprise any conventional terrestrial or wireless communications network, such as the Internet.

What is claimed is:

1. An image management apparatus for controlling a display of a captured image, the apparatus connected to a communication terminal through a network, the apparatus comprising:
 a receiver to receive, from the communication terminal, an instruction for displaying a drawn image drawn by a user on a captured image while the captured image is being displayed to the user, the captured image being a full spherical panoramic image; and
 circuitry to
  generate an attachment image containing the drawn image, and
  attach the attachment image containing the drawn image to the captured image, the attachment image containing the drawn image being a planar image,
 wherein the circuitry is configured to attach the attachment image to the captured image along a normal of a straight line passing through a center of the drawn image and a reference position, the reference position representing a point of view from which a predetermined area of the captured image is within a field of view.

2. The image management apparatus according to claim 1, wherein
 the circuitry is further configured to apply processing to the attachment image to make a portion in the attachment image other than the drawn image transparent.

3. The image management apparatus according to claim 1, wherein
 the straight line intersects with a boundary of the captured image at a first intersection point and a second intersection point, the first intersection point being farther from the reference position than the second intersection point, and
 the circuitry is further configured to set the normal of the straight line at a position that is obtained by moving the first intersection point to an inner side of the captured image by a predetermined distance along the straight line.

4. An image communication system, comprising:
 the image management apparatus of claim 1; and
 a communication terminal that displays, on a display, the captured image attached with the attachment image.

5. An image management system for controlling a display of a captured image, comprising one or more processors configured to:
 receive, from a communication terminal, an instruction for displaying a drawn image drawn by a user on a captured image while the captured image is being displayed to the user, the captured image being a full spherical panoramic image; wherein
 generate an attachment image containing the drawn image; and
 attach the attachment image containing the drawing image to the captured image, the attachment image having the drawn image being a planar image wherein
 the one or more processors are configured to attach the attachment image to the captured image along a normal of a straight line passing through a center of the drawn image and a reference position, the reference position representing a point of view from which a predetermined area of the captured image is within a field of view.

6. A method for controlling a display of a captured image, comprising:
- receiving, from a communication terminal, an instruction for displaying a drawn image drawn by a user on a captured image while the captured image is being displayed to the user, the captured image being a full spherical panoramic image;
- generating an attachment image containing the drawn image; and
- attaching the attachment image containing the drawn image to the captured image, the attachment image containing the drawn image being a planar image, wherein
- the attaching step includes attaching the attachment image to the captured image along a normal of a straight line passing through a center of the drawn image and a reference position, the reference position representing a point of view from which a predetermined area of the captured image is within a field of view.

* * * * *